US012756408B2

(12) United States Patent
Pehlke

(10) Patent No.: US 12,756,408 B2
(45) Date of Patent: Oct. 6, 2026

(54) RADIO FREQUENCY MODULE WITH REDUCED INTERMODULATION DISTORTION

(71) Applicant: Skyworks Solutions, Inc., Irvine, CA (US)

(72) Inventor: David Richard Pehlke, Westlake Village, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 335 days.

(21) Appl. No.: 18/397,949

(22) Filed: Dec. 27, 2023

(65) Prior Publication Data

US 2024/0223226 A1 Jul. 4, 2024

Related U.S. Application Data

(60) Provisional application No. 63/435,676, filed on Dec. 28, 2022.

(51) Int. Cl.
*H04B 1/00* (2006.01)
*H04B 1/16* (2006.01)

(52) U.S. Cl.
CPC ......... *H04B 1/0078* (2013.01); *H04B 1/1607* (2013.01)

(58) Field of Classification Search
CPC ... H04B 1/0078; H04B 1/1607; H04B 1/0057
See application file for complete search history.

(56) References Cited

U.S. PATENT DOCUMENTS

| | | | |
|---|---|---|---|
| 7,417,508 | B1 | 8/2008 | Quaglietta |
| 9,485,001 | B2 | 11/2016 | Wloczysiak |
| 9,571,037 | B2 | 2/2017 | Wloczysiak |
| 9,712,119 | B2 | 7/2017 | Datta et al. |
| 9,712,196 | B2 | 7/2017 | Ripley et al. |
| 9,712,197 | B2 | 7/2017 | Ripley et al. |
| 9,800,207 | B2 | 10/2017 | Datta et al. |
| 9,893,794 | B2 | 2/2018 | Wloczysiak |
| 9,966,982 | B2 | 5/2018 | Ripley et al. |
| 10,205,490 | B2 | 2/2019 | Wloczysiak |
| 10,284,167 | B2 | 5/2019 | Srirattana et al. |
| 10,340,963 | B2 | 7/2019 | Ripley et al. |
| 10,355,647 | B2 | 7/2019 | Datta et al. |
| 10,553,925 | B2 | 2/2020 | Srirattana et al. |
| 10,707,826 | B2 | 7/2020 | Srirattana et al. |

(Continued)

OTHER PUBLICATIONS

Ranta et al., "Antenna Switch Linearity Requirements for GSM/WCDMA Mobile Phone Front-Ends", The European Conference on Wireless Technology, Oct. 2005, pp. 23-26.

*Primary Examiner* — Ayodeji O Ayotunde

(74) *Attorney, Agent, or Firm* — Knobbe, Martens, Olson & Bear, LLP

(57) ABSTRACT

A radio frequency module includes a filter having a first portion with a passband corresponding to a first receive frequency band and a second portion with a passband corresponding to at least a portion of a first transmit aggressor frequency band. A signal path is configured to couple between an antenna and the filter. The filter includes an antenna-side port coupled to the signal path. The module further includes a receive amplifier coupled to the first portion of the filter and a tunable termination impedance coupled to the second portion of the filter.

20 Claims, 8 Drawing Sheets

(56) References Cited

U.S. PATENT DOCUMENTS

| | | | |
|---|---|---|---|
| 10,924,164 B2 | 2/2021 | Brunel et al. | |
| 11,101,775 B2 | 8/2021 | Datta et al. | |
| 11,101,788 B2 | 8/2021 | Ripley et al. | |
| 11,705,887 B2 | 7/2023 | Ripley et al. | |
| 11,824,569 B2 | 11/2023 | Jia et al. | |
| 11,942,912 B2 | 3/2024 | Chang | |
| 2020/0007177 A1 | 1/2020 | Ripley et al. | |
| 2021/0408992 A1 | 12/2021 | Chen et al. | |
| 2023/0283306 A1* | 9/2023 | Kani .................... | H04B 1/0057 455/552.1 |
| 2023/0318646 A1 | 10/2023 | Jia et al. | |
| 2023/0387044 A1* | 11/2023 | Maruthamuthu ........ | H03H 7/38 |
| 2024/0223226 A1 | 7/2024 | Pehlke | |

* cited by examiner

RADIO FREQUENCY MODULE WITH REDUCED INTERMODULATION DISTORTION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the invention relate to radio frequency (RF) modules and/or wireless communication devices.

Description of the Related Technology

Aspects of this disclosure relate to cellular communication systems, and in particular, to systems for high power uplink transmission for frequency division duplex (FDD) communication systems. The Specific Absorption Rate (SAR) is a measure of the energy absorbed per unit mass by a human body when exposed to a RF electromagnetic field. It can be defined as the power absorbed per mass of tissue in watts per kilogram (W/kg). Cellular user equipment (UE) must measure below Specific Absorption Rate (SAR) regulatory limits, and therefore transmit below a maximum average power in the uplink (UL) between the UE and a base station. For instance, FDD systems which transmit and receive continuously, transmit with a maximum average power below a threshold such that the total radiated power (TRP) complies with relevant SAR limits.

Established cellular communication networks are typically limited in coverage extent by two factors: capacity and the need to provide a target level of data rate and service to a large number of people in a dense area, and/or coverage range which is typically limited by UL power from battery powered mobile handsets or wearable devices.

The capacity issue can be addressed in certain environments via the establishment of smaller cells and densification of the network. Coexistence interference issues can become more prevalent in such radio environments, and thus higher uplink power may not necessarily be favored depending on how the uplink power is scheduled to overcome coexistence challenges.

The UL-limited coverage issue largely the result of an asymmetry in the power between the transmitter from base station and mobile handset. Downlink (DL) power from the base station is typically in the range of 40 W from high performance antennas and typically less than ¼ W from the mobile device. The receivers for both the base station and mobile handset are much closer to one another, both close to the theoretical physical noise limits.

Operation at the cell edge (e.g., when the user is substantially equally distant from multiple base stations) requires the highest power levels and typically reduces the modulation allocation and backs off the order of modulation to narrower bandwidths and simple Quadrature Phase-Shift Keying (QPSK) in order to preserve the signal-to-noise ratio of the UL modulation, LTE being made up of individual resource blocks (RBs). The DL can operate without changes in allocation as the transmission of the entire channel and multiple channels for the DL is typically operated at maximum power from the base station. The UL must work hard and make these trade-offs to preserve UL SNR and maintain the link back to the eNodeB (LTE) or gNodeB (NR).

Additionally, because cellphones are presently used approximately 75% of the time indoors where building penetration (especially at higher frequencies) becomes a significant challenge, cellphones may be effectively operating at the cell edge (e.g., where the link SNR degrades to a point where the link and service is at risk of being dropped, similar to the risks associated at the cell edge).

The call drop statistics and buffering indicated during low data rate periods are perhaps one of the most critical user experience statistics driving customer churn and dissatisfaction and drive much of the consumer perception of the carrier services. In continuous transmission of Frequency-Division Duplex (FDD), UL power is limited by regulatory safety limits of average power-termed Specific Absorbed Radiation (SAR) as indicators of safe amounts of electromagnetic energy absorbed in human tissue. It is not possible to increase the maximum FDD UL power because of this limit, and the Total Radiated Power (TRP) is made as high as possible to meet carrier requirements, while still meeting the regulatory maximum average power based on SAR.

Aspects of this disclosure relate to systems and methods which can provide improved UL power transmission for FDD communication without exceeding the SAR regulatory limit.

SUMMARY

In some aspects, the techniques described herein relate to a radio frequency module including: a filter having a first portion with a passband corresponding to a first receive frequency band and a second portion with a passband corresponding to at least a portion of a first transmit aggressor frequency band; a signal path configured to couple between an antenna and the filter, the filter including an antenna-side port coupled to the signal path; a receive amplifier coupled to the first portion of the filter; and a tunable termination impedance coupled to the second portion of the filter.

In some aspects, the techniques described herein relate to a radio frequency module further including a first switch configured to couple the first portion of the filter to the receive amplifier and the second portion of the filter to the tunable termination impedance.

In some aspects, the techniques described herein relate to a radio frequency module wherein the second portion of the filter includes a dual surface acoustic wave (dual-SAW) mode low power filter.

In some aspects, the techniques described herein relate to a radio frequency module wherein the radio frequency module is a receive-only diversity receive (DRx) module.

In some aspects, the techniques described herein relate to a radio frequency module further including a transmit amplifier configured to amplify a transmit signal, the filter having a third portion coupled to the transmit amplifier and having a passband corresponding to a transmit signal frequency band.

In some aspects, the techniques described herein relate to a radio frequency module further including a second switch configured to couple an output of the transmit amplifier to the third portion of the filter and to couple the second portion of the filter to the tunable termination impedance.

In some aspects, the techniques described herein relate to a radio frequency module wherein the filter includes a third portion with a passband corresponding to a second receive frequency band.

In some aspects, the techniques described herein relate to a radio frequency module wherein the first receive frequency band is a downlink band of 3GPP LTE B1 and the second receive frequency band is a downlink band of 3GPP LTE B3.

In some aspects, the techniques described herein relate to a wireless device including: a radio frequency front end module including a filter having a first portion with a passband corresponding to a first receive frequency band and a second portion with a passband corresponding to at least a portion of a first transmit aggressor frequency band, a signal path configured to couple between an antenna and the filter, the filter including an antenna-side port coupled to the signal path, a receive amplifier coupled to the first portion of the filter, and a tunable termination impedance coupled to the second portion of the filter; a transceiver coupled to the radio frequency front end module; and an antenna coupled to the radio frequency front end module.

In some aspects, the techniques described herein relate to a wireless device further including a first switch configured to couple the first portion of the filter to the receive amplifier and the second portion of the filter to the tunable termination impedance.

In some aspects, the techniques described herein relate to a wireless device wherein the second portion of the filter includes a dual surface acoustic wave (dual-SAW) mode low power filter.

In some aspects, the techniques described herein relate to a wireless device wherein the radio frequency front end module is a receive-only diversity receive (DRx) module.

In some aspects, the techniques described herein relate to a wireless device further including a transmit amplifier configured to amplify a transmit signal, the filter having a third portion coupled to the transmit amplifier and having a passband corresponding to a transmit signal frequency band.

In some aspects, the techniques described herein relate to a wireless device further including a second switch configured to couple an output of the transmit amplifier to the third portion of the filter and to couple the second portion of the filter to the tunable termination impedance.

In some aspects, the techniques described herein relate to a wireless device wherein the filter includes a third portion with a passband corresponding to a second receive frequency band.

In some aspects, the techniques described herein relate to a wireless device wherein the first receive frequency band is a downlink band of 3GPP LTE B1 and the second receive frequency band is a downlink band of 3GPP LTE B3.

In some aspects, the techniques described herein relate to a radio frequency front end system including: a filter having a first portion with a passband corresponding to a first receive frequency band and a second portion with a passband corresponding to at least a portion of a first transmit aggressor frequency band; a signal path configured to couple between an antenna and the filter, the filter including an antenna-side port coupled to the signal path; a receive amplifier coupled to the first portion of the filter; and a tunable termination impedance coupled to the second portion of the filter.

In some aspects, the techniques described herein relate to a radio frequency front end system further including a first switch configured to couple the first portion of the filter to the receive amplifier and the second portion of the filter to the tunable termination impedance.

In some aspects, the techniques described herein relate to a radio frequency front end system wherein the second portion of the filter includes a dual surface acoustic wave (dual-SAW) mode low power filter.

In some aspects, the techniques described herein relate to a radio frequency front end system wherein the radio frequency front end system is a receive-only diversity receive (DRx) module.

DETAILED DESCRIPTION OF EMBODIMENTS

Figure 1:
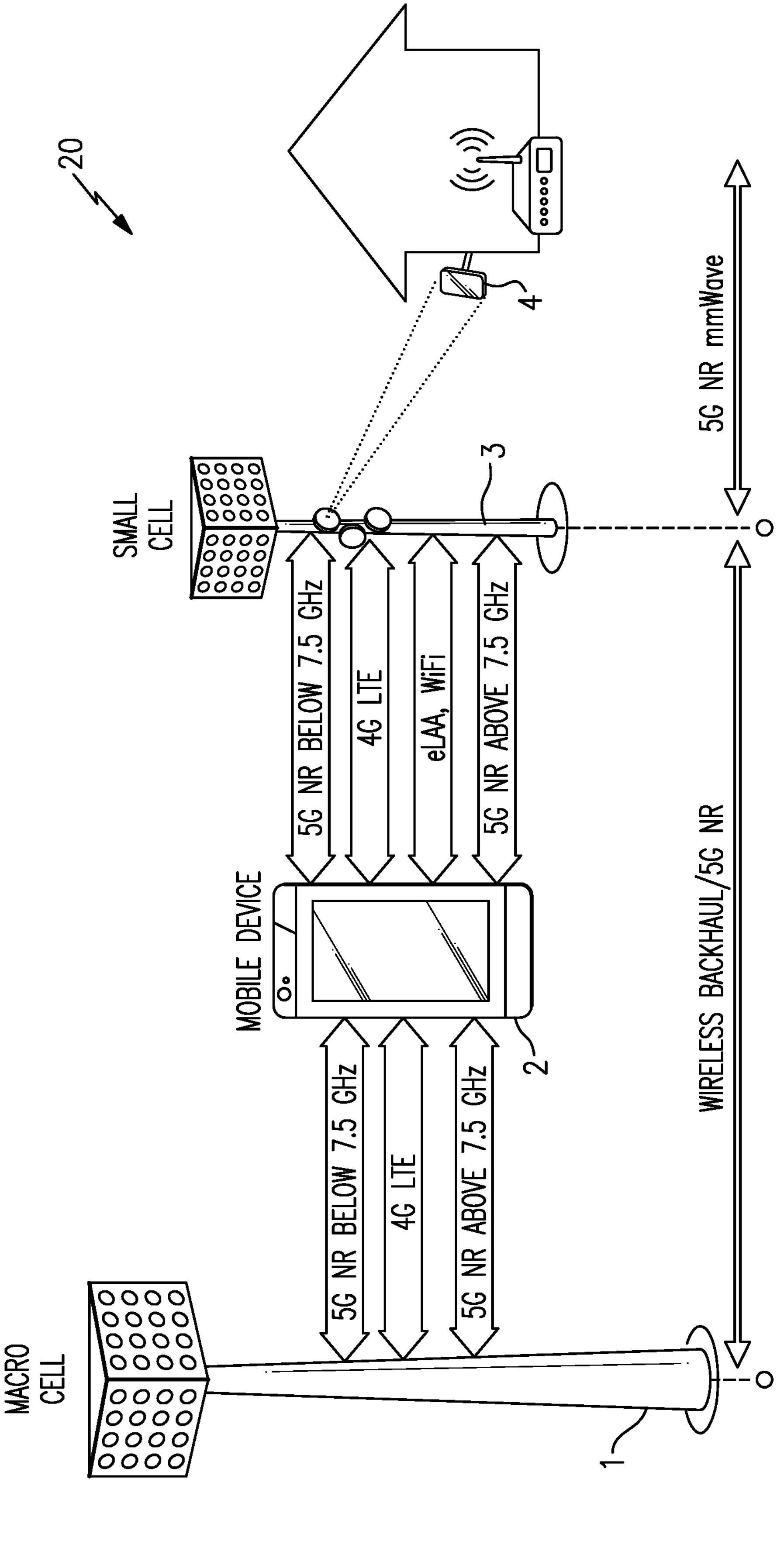
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

FIG. 1 is a schematic diagram of one example of a communication network 20. The communication network 20 includes a macro cell base station 1, a mobile device 2, a small cell base station 3, and a stationary wireless device 4.

The illustrated communication network 20 of FIG. 1 supports communications using a variety of technologies, including, for example, 4G LTE, 5G NR, and wireless local area network (WLAN), such as Wi-Fi. In the communication network 20, dual connectivity can be implemented with concurrent 4G LTE and 5G NR communication with the mobile device 2. Although various examples of supported communication technologies are shown, the communication network 20 can be adapted to support a wide variety of communication technologies.

Various communication links of the communication network 20 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

As shown in FIG. 1, the mobile device 2 communicates with the macro cell base station 1 over a communication link that uses a combination of 4G LTE and 5G NR technologies. The mobile device 2 also communications with the small cell base station 3. In the illustrated example, the mobile device 2 and small cell base station 3 communicate over a communication link that uses 5G NR, 4G LTE, and Wi-Fi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed Wi-Fi frequencies).

In certain implementations, the mobile device 2 communicates with the macro cell base station 2 and the small cell base station 3 using 5G NR technology over one or more frequency bands that are less than 7.5 Gigahertz (GHz) and/or over one or more frequency bands that are greater than 7.5 GHz. For example, wireless communications can utilize Frequency Range 1 (FR1), Frequency Range 2 (FR2), or a combination thereof. In one embodiment, the mobile device 2 supports a HPUE power class specification.

The illustrated small cell base station 3 also communicates with a stationary wireless device 4. The small cell base station 3 can be used, for example, to provide broadband service using 5G NR technology. In certain implementations, the small cell base station 3 communicates with the stationary wireless device 4 over one or more millimeter wave frequency bands in the frequency range of 30 GHz to 300 GHz and/or upper centimeter wave frequency bands in the frequency range of 24 GHz to 30 GHz.

In certain implementations, the small cell base station 3 communicates with the stationary wireless device 4 using beamforming. For example, beamforming can be used to focus signal strength to overcome path losses, such as high loss associated with communicating over millimeter wave frequencies.

The communication network 20 of FIG. 1 includes the macro cell base station 1 and the small cell base station 3. In certain implementations, the small cell base station 3 can operate with relatively lower power, shorter range, and/or with fewer concurrent users relative to the macro cell base station 1. The small cell base station 3 can also be referred to as a femtocell, a picocell, or a microcell.

Although the communication network 20 is illustrated as including two base stations, the communication network 20 can be implemented to include more or fewer base stations and/or base stations of other types. As shown in FIG. 1, base stations can communicate with one another using wireless communications to provide a wireless backhaul. Additionally or alternatively, base stations can communicate with one another using wired and/or optical links.

The communication network 20 of FIG. 1 is illustrated as including one mobile device and one stationary wireless device. The mobile device 2 and the stationary wireless device 4 illustrate two examples of user devices or user equipment (UE). Although the communication network 20 is illustrated as including two user devices, the communication network 20 can be used to communicate with more or fewer user devices and/or user devices of other types. For example, user devices can include mobile phones, tablets, laptops, Internet of Things (IoT) devices, wearable electronics, and/or a wide variety of other communications devices.

User devices of the communication network 20 can share available network resources (for instance, available frequency spectrum) in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user device a unique code, space-divisional multiple access (SDMA) in which beamforming is used to provide shared access by spatial division, and non-orthogonal multiple access (NOMA) in which the power domain is used for multiple access. For example, NOMA can be used to serve multiple user devices at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user device. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with IoT applications.

The communication network 20 of FIG. 1 can be used to support a wide variety of advanced communication features, including, but not limited to eMBB, uRLLC, and/or mMTC.

A peak data rate of a communication link (for instance, between a base station and a user device) depends on a variety of factors. For example, peak data rate can be affected by channel bandwidth, modulation order, a number of component carriers, and/or a number of antennas used for communications.

For instance, in certain implementations, a data rate of a communication link can be about equal to $M*B*\log_2(1+S/N)$, where M is the number of communication channels, B is the channel bandwidth, and S/N is the signal-to-noise ratio (SNR).

Accordingly, data rate of a communication link can be increased by increasing the number of communication channels (for instance, transmitting and receiving using multiple antennas), using wider bandwidth (for instance, by aggregating carriers), and/or improving SNR (for instance, by increasing transmit power and/or improving receiver sensitivity).

5G NR communication systems can employ a wide variety of techniques for enhancing data rate and/or communication performance.

Figure 2:
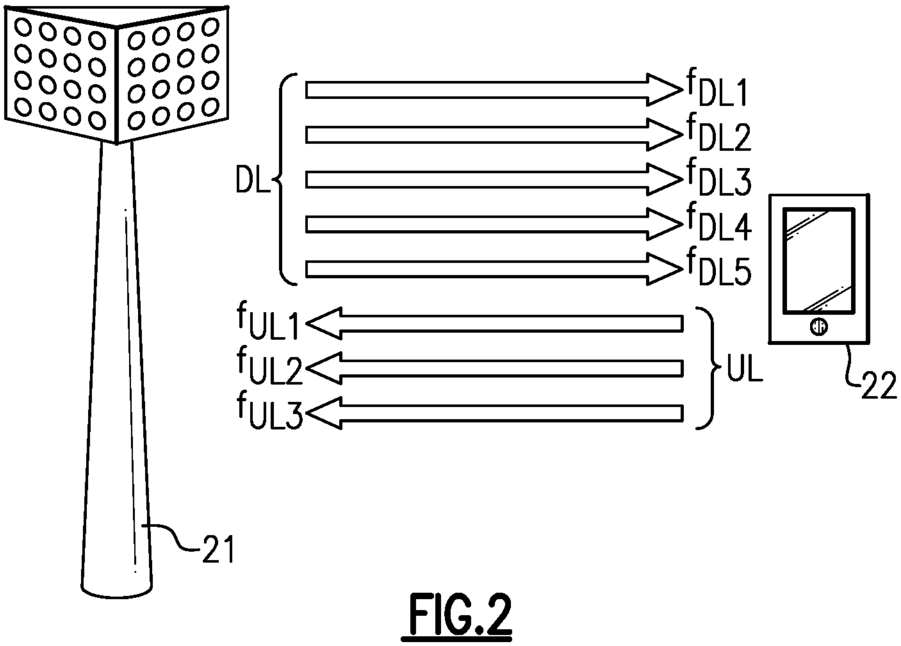
FIG. 2 is a schematic diagram of one example of a communication link using carrier aggregation.

FIG. 2 is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations. Carrier aggregation can present technical challenges for measuring power of individual carriers. Radio frequency systems disclosed herein can measure power associated with one or more transmit paths in carrier aggregation applications. Embodiments disclosed herein can be implemented in carrier aggregation applications.

In the illustrated example, the communication link is provided between a base station 21 and a mobile device 22. As shown in FIG. 2, the communications link includes a downlink channel used for RF communications from the base station 21 to the mobile device 22, and an uplink channel used for RF communications from the mobile device 22 to the base station 21.

Although FIG. 2 illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2, the uplink channel includes three aggregated component carriers fUL1, fUL2, and fUL3. Additionally, the downlink channel includes five aggregated component carriers fDL1, fDL2, fDL3, fDL4, and fDL5. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 3A:
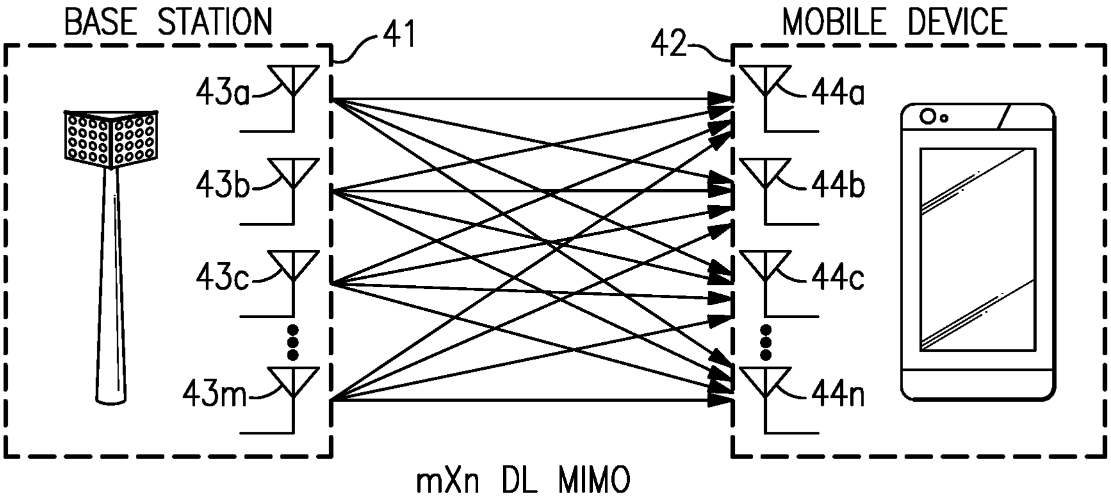
FIG. 3A is a schematic diagram of one example of a downlink channel using multi-input and multi-output (MIMO) communications.
Figure 3B:
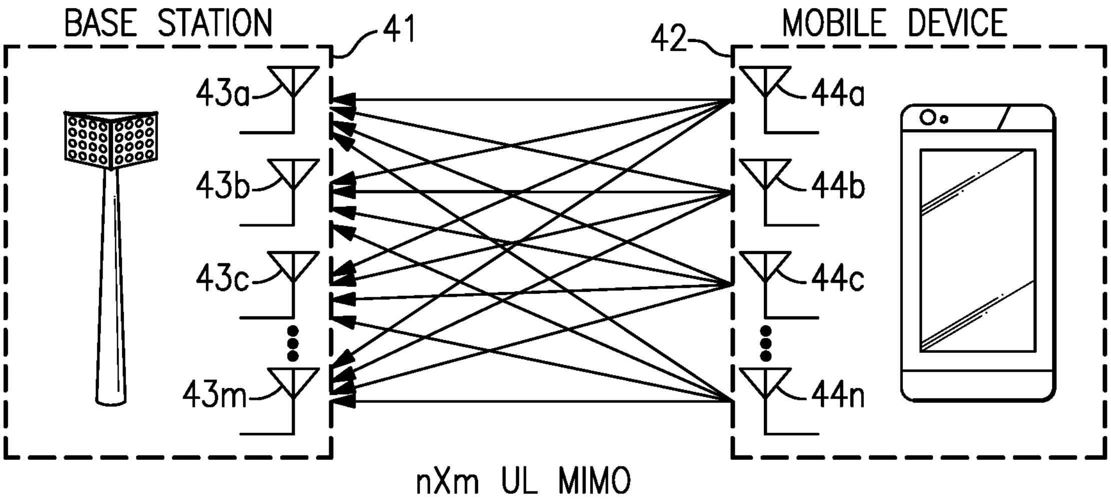
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43 *a*, 43 *b*, 43 *c*, . . . 43 *m* of the base station 41 and receiving using N antennas 44 *a*, 44 *b*, 44 *c*, . . . 44 *n* of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44 *a*, 44 *b*, 44 *c*, . . . 44 *n* of the mobile device 42 and receiving using M antennas 43 *a*, 43 *b*, 43 *c*, . . . 43 *m* of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
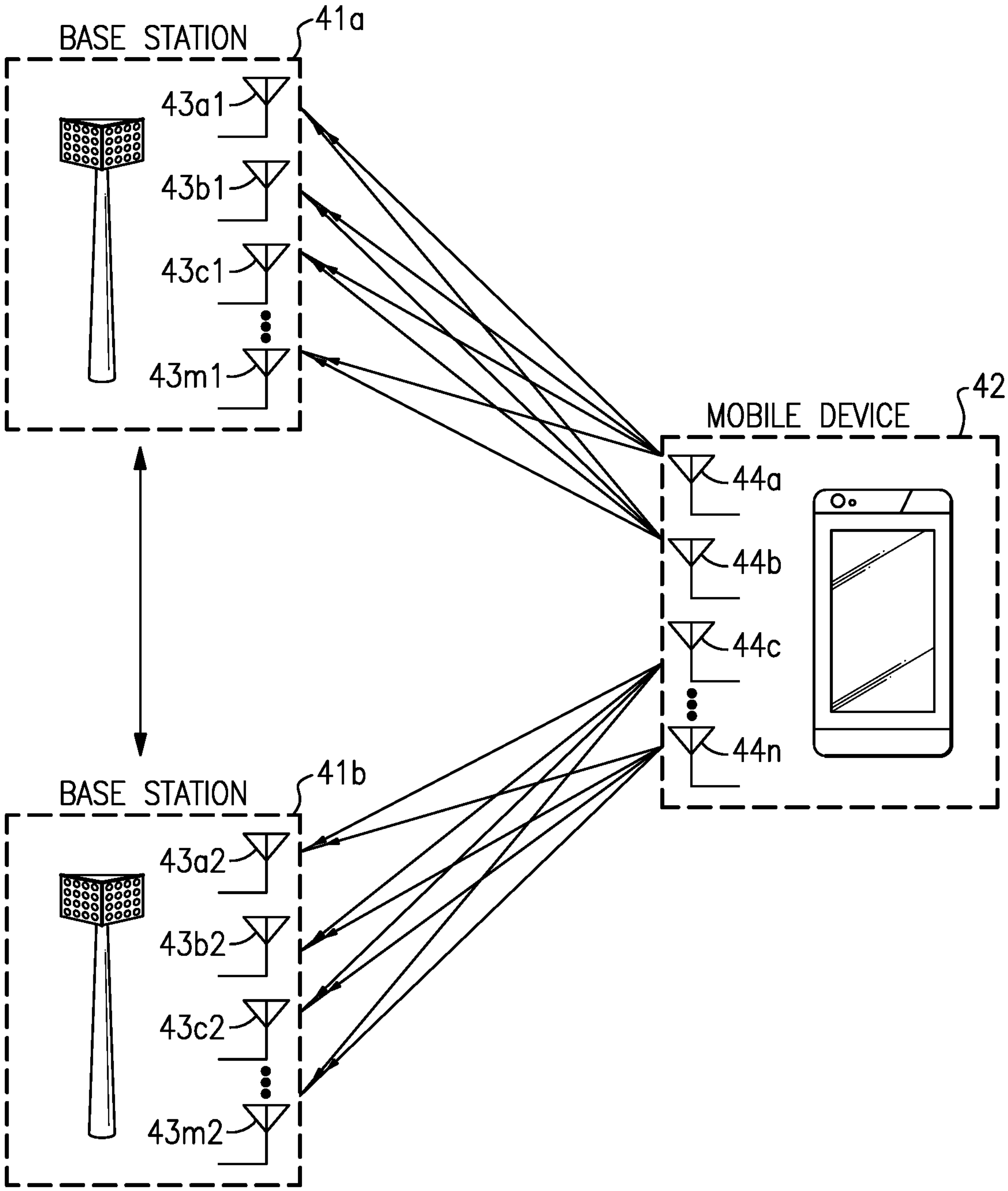
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44 *a*, 44 *b*, 44 *c*, . . . 44 *n* of the mobile device 42. Additionally, a first portion of the uplink transmissions are received using M antennas 43 *a* 1, 43 *b* 1, 43 *c* 1, . . . 43 *m* 1 of a first base station 41 *a*, while a second portion of the uplink transmissions are received using M antennas 43 *a* 2, 43 *b* 2, 43 *c* 2, . . . 43 *m* 2 of a second base station 41 *b*. Additionally, the first base station 41 *a* and the second base station 41 *b* communication with one another over wired, optical, and/or wireless links.

The MIMO scenario of FIG. 3C illustrates an example in which multiple base stations cooperate to facilitate MIMO communications.

Figure 4:
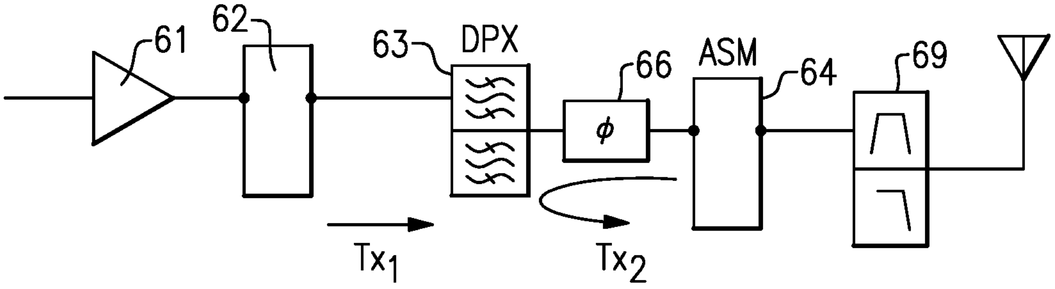
FIG.4 Prior Art
FIG. 4 is a schematic diagram of a radio frequency module according to the prior art.

FIG. 4 is a schematic diagram of a radio frequency module. The radio frequency module comprises a power amplifier 61, a switch 62, a duplexer 63, an antenna switch module 64, a coupler 66 and an antenna tuner 69 (which can also be referred to as a multiplexer or antenna plexer). The coupler 66 is implemented between the duplexer 63 and the antenna switch module 64. Alternatively or additionally, the coupler 66 can be implemented between the antenna switch module 64 and the antenna tuner 69 or between the antenna tuner 69 and an antenna. Where the coupler 66 placed post the duplexer 63, somewhere between the duplexer 63 and the antenna, there can be a high and phase dependent reflection of an out-of-band back injected blocker. For example, a second transmit signal Tx2 from another transmit channel on the radio frequency module can be back-injected at the antenna tuner 69 or at the antenna switch module 64, reflect off of the duplexer 63, and result in reverse intermodulation (RIMD), which is out of band (OOB) relative to one or more receive paths.

Certain embodiments described hersein reduce reflection of the back-injected out-of-band Tx2. For example, embodiments herein include a termination of the back-injected second Tx2 and the relative phase of that complex impedance can be critical to the overall resulting intermodulation (RIMD).

Figure 5:
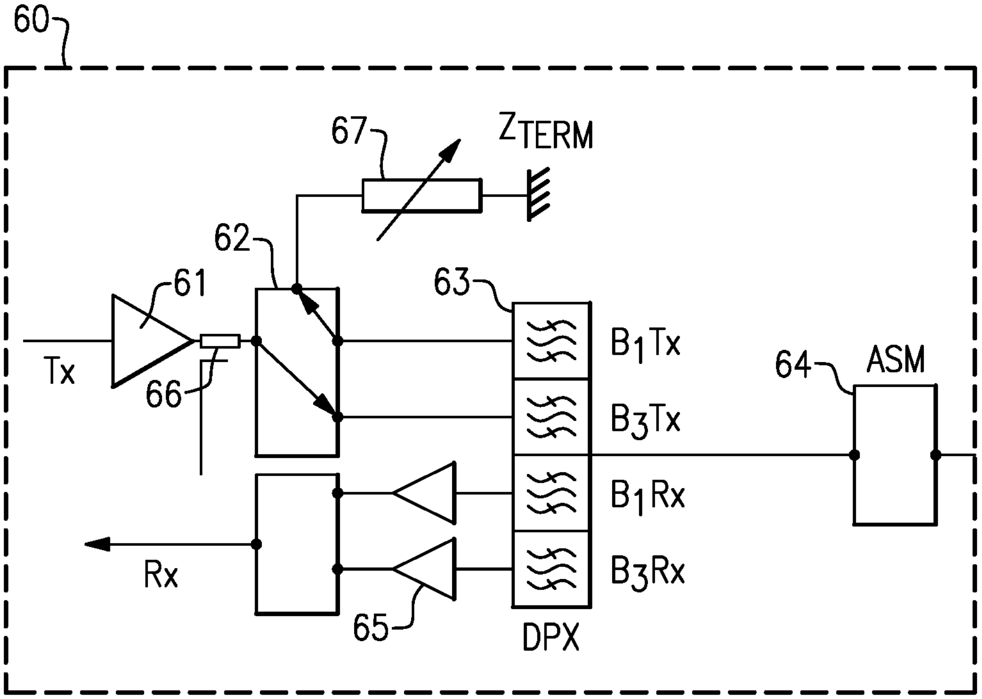
FIG. 5 is a schematic diagram of one example of a radio frequency module.

FIG. 5 is a schematic diagram of an example of a radio frequency module 60 according to certain embodiments. In the illustrated example, the radio frequency module 60 comprises a power amplifier 61, a post power amplifier (post-PA) switch 62 (e.g., a band switch), a filter 63, an antenna switch module 64, a low noise amplifier 65, a directional coupler 66 and a tunable termination impedance 67.

The radio frequency module 60 comprises a transmit Tx path and a receive Rx path. The receive Rx path is configured for passage of a Rx signal in multiple frequency bands. The filter 63 can include a pair of frequency division duplexers including a first duplexer for B1 having passbands spanning B1Tx and BlRx, respectively, and a second duplexer having passbands spanning B3Tx and B3Rx, respectively. As such, the portion of the Rx signal within B1Rx passes through the B1Rx portion of the filter 63 to the corresponding (top) low noise amplifier 65 and the portion of the Rx signal within B3Rx passes through the B3Rx portion of the filter 634 to the corresponding (bottom) low noise amplifier 65. In the illustrated embodiment, a multiplexer connected to the low noise amplifiers 65 can combine the signals into a single Rx output, which can be communicated from the module 60 to a transceiver (not shown) for subsequent downconversion and a baseband processor (not shown) for baseband processing. The transmit Tx path can transmit a transmit radio frequency Tx signal to at least one antenna (not shown). The transmit Tx path is further configured for passage of a Tx signal selectively through either the B1Tx filter or the B3Tx filter of the bandpass filter 63, depending on the state of the band select switch 62. The band select switch 62 can include a tunable termination impedance 67 via which at least one of the B1Tx or B3Tx portions of the filter 63 can be terminated. For example, in the illustrated embodiment, the switch 62 is configured for B3Tx transmission, such that the B1Tx portion of the filter 63 is connected to the tunable termination impedance 67, and the B3Tx portion of the filter 63 is connected to the power amplifier 61. Depending on the embodiment, the switch can be configured for B1Tx transmission to alternatively couple the B1Tx portion of the filter 63 to the power amplifier 61 and couple the B3Tx portion of the filter 63 to the tunable termination impedance 67. In other embodiments, the switch 62 permanently connects the B1Tx portion of the filter 63 to the tunable termination impedance 67. For example, a controller (not shown) of the front end module 60 can be configured to output a signal coupled to the tunable termination impedance 67 to adjust an impedance of the tunable termination impedance 67.

The power amplifier 61 is configured to amplify the Tx signal. Furthermore, the power amplifier 61 includes an output having a first output impedance. The power amplifier 61 may receive the Tx signal from a transceiver (not shown) at an input of the power amplifier 61.

In the switched configuration shown in FIG. 5, the band select switch 62 routes a B3Tx signal in band B3, for instance, from the output of the power amplifier 61 through the B3Tx portion of the filter 63 to the antenna switch module 64 for transmission. The B1Tx portion of the filter 63 can have a passband that spans some or all of a transmit band of an aggressor transmit signal Tx2, such as another transmit channel of the module 60. Thus, noise from the aggressor transmit signal Tx2 can pass through the B1Tx portion of the filter to the tunable termination impedance 67. In this manner, the tunable termination impedance 67 can be tuned to reduce RIMD resulting from the aggressor transmit signal Tx2.

The illustrated band-select switch 62 implements a double pole multi throw (DPMT) functionality, the quantity M being an integer greater than 1, one pole of the double pole in communication with the power amplifier 61, the other pole of the double pole in communication with the tunable termination impedance 67 and at least one of the M throws in communication with the filter 63.

Optionally, the B1Tx, B3Tx, B1Rx, and/or B3Rx portions of the filter 63 can be implemented using dual surface acoustic wave (dual-SAW) mode low power filters or other acoustic wave devices, such as other filters incorporating surface acoustic wave (SAW) resonator(s) and/or bulk acoustic wave (BAW) resonators. For example, in one embodiment, the filter portion B1Tx is permanently connected to the tunable termination impedance 67, and therefore does not transmit data, and comprises a dual-SAW mode filter or another low power SAW or BAW device.

Typically, a duplexer filter is a three-port circuit element comprising transmitter port, a receiver port, and an antenna port. An RF signal supplied to the transmitter port at the transmit frequency sees the signal path towards the receiver port as a high impedance, so that the radio power is not substantially directed to the receiver port, but it is directed through the antenna port to the antenna, where it is radiated as a RF signal to the environment. Correspondingly, an RF signal received through the antenna and the antenna port at the receive frequency sees the transmitter port as a high impedance, so that it is directed to the receiver port and further to the receiver sections of the radio device. The function of the duplexer filter is generally based on different frequency response characteristics of the filter components. Further combinations of these Tx and Rx bands can be logically extended to gang multiple Tx and Rx filters together toward a single antenna port as well. For example, the multiple frequency bands include bands B1 and B3 associated with a 3GPP communication standard.

In some implementations, any of the duplexers (or the modules including a duplexer) disclosed herein can include power amplifiers or other components. For example, the duplexer can be implemented as a power amplifier with integrated duplexer (PAiD). Any of the modules or duplexers disclosed herein can be implemented as a PAiD.

The tunable termination impedance 67 is configured to adjust a critical complex phase of the impedance. The tunable termination impedance 67 can be configured to be band-specific, in particular to be channel-specific. The tunable termination impedance 67 can be coupled to the switch 62 and ground.

The directional coupler 66 is implemented along the Tx path and configured to extract a portion of the power from the Tx signal, e.g., for monitoring/measurement. In particular, the illustrated directional coupler 66 is implemented between the power amplifier 61 and the post-PA switch 62.

The antenna switch module 64 is coupled to the bandpass filter 63. Furthermore, the antenna switch module 64 is configured to connect at least on antenna to the bandpass filter 63.

Hence, the proposed invention provides a termination through a filter, e.g., the B1Tx portion of the filter 63, in the frequency range of a transmit aggressor Tx2, which is out of band of one or more receive channels, with either a 50 Ohm, or tunable complex impedance that can effectively adjust the critical complex phase of the impedance presented to the transmit aggressor signal Tx2.

Advantageously, the radio frequency module 60 can optimize emissions/IMS/RxDeSense performance by adjusting the critical complex phase of the impedance for minimization of the IMD. Moreover, the tunable termination impedance 67 can be used to optimize the IMD performance of the overall path, and uniquely enable higher power for both Tx1 and Tx2 with acceptable IMD and emissions to support much larger coverage area for the UL-limited EN-DC/UL CA use case.

Figure 6:
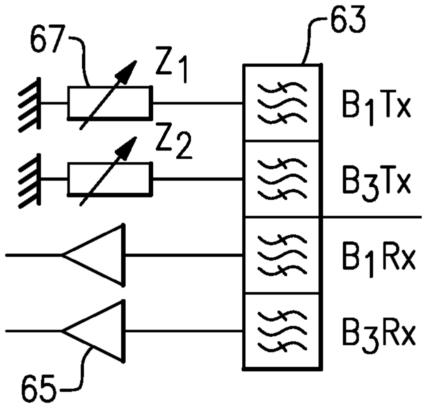
FIG. 6 is a schematic diagram of a second example of a radio frequency module.

FIG. 6 illustrates a schematic diagram of another example of a radio frequency module. In particular, the radio frequency module is configured as a Rx-only diversity receive (DRx) module. The module includes a filter 63 having four filters that are ganged together, including a B3Rx portion having a passband spanning B3Rx, a BlRx portion having a passband spanning B1Rx, a B1Tx portion having a passband spanning B1Tx, and a B3Tx portion having a passband spanning B3Tx. While the filter portions B1Tx and B3Tx span transmit passbands, the filter portions B1Tx and B3Tx are not used to transmit data. Rather, the filter portions B1Tx and B3Tx are connected to respective tunable termination impedances 67 to allow for reduction of RIMD caused by by one or more aggressor transmit signals represented by Tx2. For example, the filter portion B1Tx can have a passband that spans some or all of a passband of a transmit aggressor having a first band, whereas the filter portion B3Tx can have a passband that spans some or all of a passband of a transmit aggressor having a second band.

Furthermore, the DRx module comprises two low noise amplifiers 65 coupled to the B1Rx and B3Rx portions of the filter 63, respectively.

The bandpass filter 63 can be configured as a dual duplexer filter having a first B1 duplexer portion comprising the B1Tx and B1Rx filter portions and a second B3 duplexer portion comprising the B3Tx and B3Rx filter portions. Alternatively, any band associated with a 3GPP communication standard can be provided. Moreover, the bandpass filter 63 can be configured to implement more than two duplexers spanning Tx/Rx frequencies of more than two FDD bands.

Thus, a configuration of the radio frequency module as described in FIG. 6 can minimize the cost of an overhead by large through power in the Rx-only module, when supported with a smaller dual SAW mode low power Rx-style filter. The filter portions B1Tx, B3Tx, B1Rx, and/or B3Rx can comprise dual SAW mode low power filters or other acoustic wave devices, such as other filters incorporating surface acoustic wave (SAW) resonator(s) and/or bulk acoustic wave (BAW) resonators. For instance, because, none of the filter portions B1Tx, B3Tx, B1Rx, B3Rx are used for signal transmission, some or all of these filter portions comprise dual SAW mode filters or other low power SAW or BAW filters. Moreover, the tunable termination impedance 67 can be used to optimize the IMD performance of the overall path, and uniquely enable higher power for both Tx1 and Tx2 with acceptable IMD and emissions to support much larger coverage area for the UL-limited EN-DC/UL CA use case.

Figure 7:
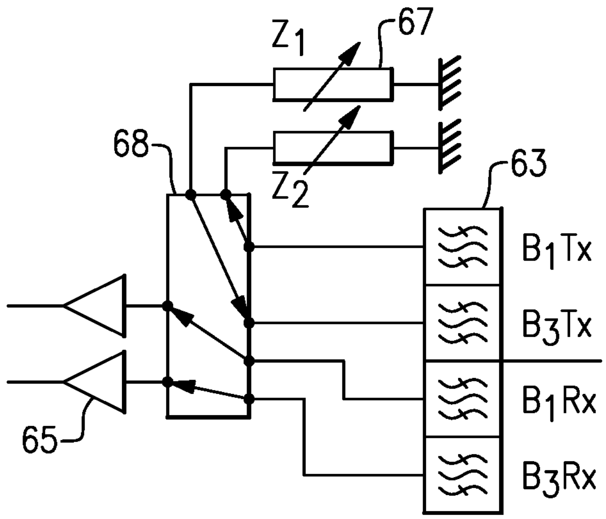
FIG. 7 is a schematic diagram of a third example of a radio frequency module.

FIG. 7 is a schematic diagram of another example of a radio frequency module. The radio frequency module of FIG. 7 basically comprises the same features as the radio frequency module of FIG. 6. However, in contrast to FIG. 6, the radio frequency module of FIG. 7 further comprises a switch 68. The switch 68 can be configured to receive and route the Rx signal from the bandpass filter 63 to the tunable termination impedance 67.

For example, the pre-LNA switch 68 is configured to include a quad pole four throw (QP4T) functionality, two poles of the quad pole each in communication with a low noise amplifier 65, the other two poles of the quad pole each in communication with the tunable termination impedance 67 and the four throws in communication with the bandpass filter 63.

Hence, the DRx module provides an additional Tx bandpass filter in order to properly phase adjust the complex impedance presented in this critical frequency range. Moreover, the tunable termination impedance 67 can be used to optimize the IMD performance of the overall path, and uniquely enable higher power for both Tx1 and Tx2 with acceptable IMD and emissions to support much larger coverage area for the UL-limited EN-DC/UL CA use case.

Figure 8:
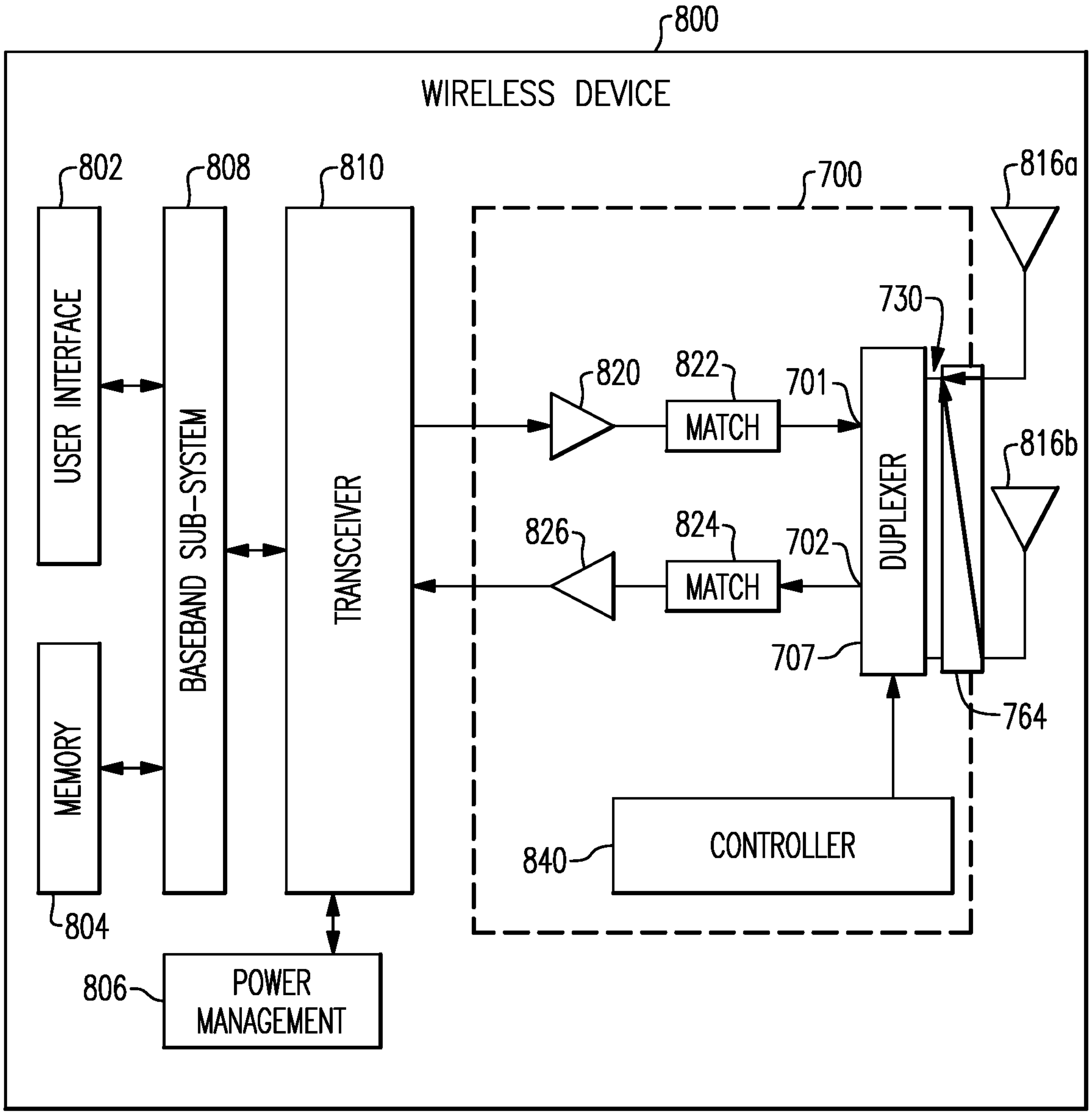
FIG. 8 is a schematic block diagram of one example of a wireless device.

FIG. 8 depicts an example wireless device 800 having one or more advantageous features described herein. In the context of a module having one or more features as described herein, such a module can be generally depicted by a dashed box 700, and can be implemented as, for example, a front-end module (FEM).

Referring to FIG. 8, power amplifiers (PAs) 820 can receive their respective RF signals from a transceiver 810 that can be configured and operated in known manners to generate RF signals to be amplified and transmitted, and to process received signals. Similarly, low-noise amplifiers (LNAs) 826 can receive their respective signals for delivery to the transceiver 810. The transceiver 810 is shown to interact with a baseband sub-system 808 that is configured to provide conversion between data and/or voice signals suitable for a user and RF signals suitable for the transceiver 810. The transceiver 810 can also be in communication with a power management component 806 that is configured to manage power for the operation of the wireless device 800. Such power management can also control operations of the baseband sub-system 808 and the module 700.

The baseband sub-system 808 is shown to be connected to a user interface 802 to facilitate various input and output of voice and/or data provided to and received from the user. The baseband sub-system 808 can also be connected to a memory 804 that is configured to store data and/or instructions to facilitate the operation of the wireless device, and/or to provide storage of information for the user.

In the example wireless device 800, outputs of the PAs 820 are shown to be matched (via respective match circuits 822) and routed to a duplexer 707 for routing to a particular antenna 816 *a*, 816 *b*. The duplexer 707 can be configured as any of the duplexers described herein. In some embodiments, the duplexer 707 can include an antenna switch module for routing to a targeted antenna. Additionally or alternatively, an antenna switch module 764 can be implemented between the duplexer 707 and the antennas 816*a*, 816*b* for routing to a targeted antenna. Thereby, the antenna switch module 764 can be configured as any of the antenna switch modules described herein. Received signals are routed to low-noise amplifiers (LNAs) 826 through a match circuit 824. The duplexer 707 includes a transmit port 701 for receiving a transmit RF signal and a receive port 702 for providing a receive RF signal. The duplexer 707 also includes a plurality of antenna ports 730 respectively coupled to the plurality of antennas 816 *a*, 816 *b*. The duplexer 707 is configured to route the transmit RF signal from the transmit port 701 to a first antenna port of the plurality of antenna ports 730 selected based on an antenna select signal. The duplexer 707 is also configured to route the receive RF signal to the receive port 702 from a second antenna port of the plurality of antenna ports 730 selected based on the antenna select signal. The module also includes a controller 840 configured to provide the antenna select signal to the duplexer 707, as described in greater detail herein.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

Figure 9:
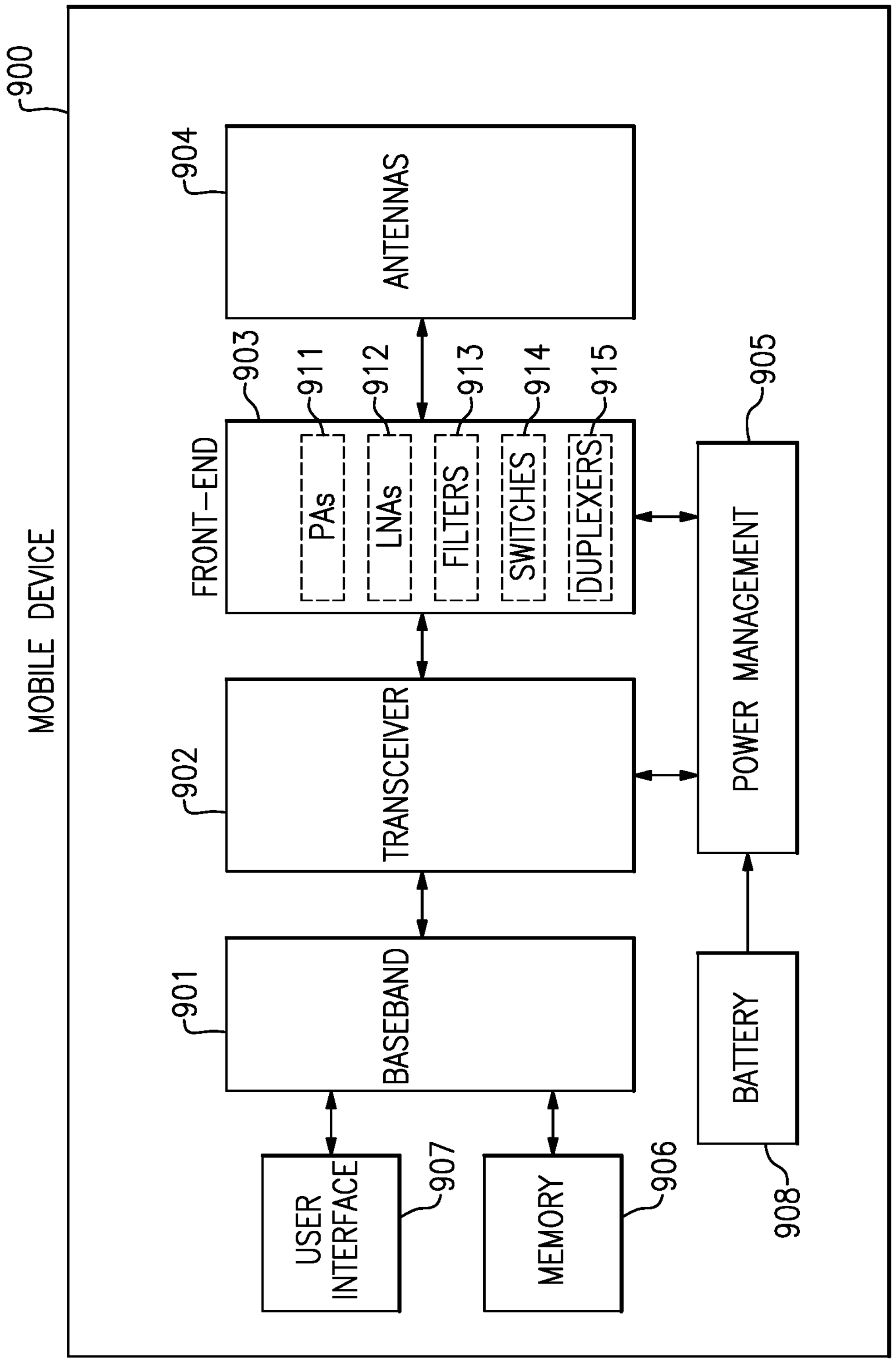
FIG. 9 is a schematic block diagram of one example of a mobile device.

FIG. 9 is a schematic diagram of one example of a mobile device 900. The mobile device 900 includes a baseband system 901, a transceiver 902, a front-end system 903, antennas 904, a power management system 905, a memory 906, a user interface 907, and a battery 908.

The mobile device 900 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), WMAN (for instance, WiMax), and/or GPS technologies.

The transceiver 902 generates RF signals for transmission and processes incoming RF signals received from the antennas 904.

The front-end system 903 aids in conditioning signals transmitted to and/or received from the antennas 904. In the illustrated embodiment, the front-end system 903 includes power amplifiers (PAs) 911, low noise amplifiers (LNAs) 912, filters 913, switches 914, and duplexers 915. However, other implementations are possible.

For example, the front-end system 903 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 900 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 904 can include antennas used for a wide variety of types of communications. For example, the antennas 904 can include antennas for transmitting and/or receiving signals associated with a wide variety of frequencies and communications standards.

In certain implementations, the antennas 904 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 900 can operate with beamforming in certain implementations. For example, the front-end system 903 can include phase shifters having variable phase controlled by the transceiver 902. Additionally, the phase shifters are controlled to provide beam formation and directivity for transmission and/or reception of signals using the antennas 904. For example, in the context of signal transmission, the phases of the transmit signals provided to the antennas 904 are controlled such that radiated signals from the antennas 904 combine using constructive and destructive interference to generate an aggregate transmit signal exhibiting beam-like qualities with more signal strength propagating in a given direction. In the context of signal reception, the phases are controlled such that more signal energy is received when the signal is arriving to the antennas 904 from a particular direction. In certain implementations, the antennas 904 include one or more arrays of antenna elements to enhance beamforming.

The baseband system 901 is coupled to the user interface 907 to facilitate processing of various user input and output (I/O), such as voice and data. The baseband system 901 provides the transceiver 902 with digital representations of transmit signals, which the transceiver 902 processes to generate RF signals for transmission. The baseband system 901 also processes digital representations of received signals provided by the transceiver 902. As shown in FIG. 9, the baseband system 901 is coupled to the memory 906 of facilitate operation of the mobile device 900.

The memory 906 can be used for a wide variety of purposes, such as storing data and/or instructions to facilitate the operation of the mobile device 900 and/or to provide storage of user information.

The power management system 905 provides a number of power management functions of the mobile device 900. In certain implementations, the power management system 905 includes a PA supply control circuit that controls the supply voltages of the power amplifiers 911. For example, the power management system 905 can be configured to change the supply voltage(s) provided to one or more of the power amplifiers 911 to improve efficiency, such as power added efficiency (PAE).

As shown in FIG. 9, the power management system 905 receives a battery voltage from the battery 908. The battery 908 can be any suitable battery for use in the mobile device 900, including, for example, a lithium-ion battery.

The front-end system 903 of FIG. 9 can be implemented in accordance with one or more features of the present disclosure. Although the mobile device 900 illustrates one example of a RF communication device that can include a RFFE system implemented in accordance with the present disclosure, the teachings herein are applicable to a wide variety of RF electronics.

Applications

Some of the embodiments described above have provided examples in connection with wireless devices or mobile phones. However, the principles and advantages of the embodiments can be used for any other systems or apparatus that have needs for front end modules.

Such front end modules can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio frequency module comprising:

a filter including a first duplexer for a first frequency band and having a first receive filter portion with a passband corresponding to a first receive signal of the first frequency band and a first transmit filter portion with a passband corresponding to a first transmit signal of the first frequency band, the filter further including a second duplexer for a second frequency band and having a second receive filter portion with a passband corresponding to a second receive signal of the second frequency band and a second transmit filter portion with a passband corresponding to a second transmit signal of the second frequency band;

a signal path configured to couple between an antenna and the filter, the filter including an antenna-side port coupling to the signal path to the first duplexer and the second duplexer;

a receive amplifier coupled to the first receive filter portion of the first duplexer of the filter, the receive amplifier configured to amplify the first receive signal;

a first band switch; and a first tunable termination impedance coupled to the first transmit filter portion of the first duplexer of the filter through the first band switch, the first tunable termination impedance configured to terminate the first transmit filter portion of the first duplexer.

2. The radio frequency module of claim 1 wherein the first band switch is further configured to couple the second transmit filter portion of the second duplexer of the filter to the first tunable termination impedance.

3. The radio frequency module of claim 1 wherein at least one of the first receive filter portion or the first transmit filter portion includes a dual surface acoustic wave (dual-SAW) mode low power filter.

4. The radio frequency module of claim 1 wherein the radio frequency module is a receive-only diversity receive (DRx) module.

5. The radio frequency module of claim 1 further comprising a transmit amplifier having an output coupled to the first transmit filter portion through the first band switch.

6. The radio frequency module of claim 5 further comprising a second band switch coupled to an output of the receive amplifier.

7. The radio frequency module of claim 1 wherein the first frequency band is 3GPP LTE B1 and the second frequency band is 3GPP LTE B3.

8. A wireless device comprising:

a radio frequency front end module including a filter including a first duplexer for a first frequency band and having a first receive filter portion with a passband corresponding to a first receive signal of the first frequency band and a first transmit filter portion with a passband corresponding to a first transmit signal of the first frequency band, the filter further including a second duplexer for a second frequency band and having a second receive filter portion with a passband corresponding to a second receive signal of the second frequency band and a second transmit filter portion with a passband corresponding to a second transmit signal of the second frequency band, the radio frequency front end module further including a receive amplifier coupled to the first receive filter portion of the first duplexer of the filter and configured to amplify the first receive signal, a first band switch, and a first tunable termination impedance coupled to the first transmit filter portion of the filter through the first band switch, the first tunable termination impedance configured to terminate the first transmit filter portion of the first duplexer;

a transceiver coupled to the radio frequency front end module; and an antenna coupled to the filter by a signal path of the radio frequency front end module, the filter including an antenna-side port coupling the signal path to the first duplexer and the second duplexer.

9. The wireless device of claim 8 wherein the first band switch is further configured to couple the second transmit filter portion of the second duplexer of the filter to the first tunable termination impedance.

10. The wireless device of claim 8 wherein at least one of the first receive filter portion or the first transmit filter portion includes a dual surface acoustic wave (dual-SAW) mode low power filter.

11. The wireless device of claim 8 wherein the radio frequency front end module is a receive-only diversity receive (DRx) module.

12. The wireless device of claim 8 wherein the radio frequency front end module further includes a transmit amplifier having an output coupled to the first transmit filter portion through the first band switch.

13. The wireless device of claim 12 wherein the radio frequency front end module further includes a second band switch coupled to an output of the receive amplifier.

14. The wireless device of claim 8 wherein the first frequency band is 3GPP LTE B1 and the second frequency band is 3GPP LTE B3.

15. A radio frequency front end system comprising:

a filter including a first duplexer for a first frequency band and having a first receive filter portion with a passband corresponding to a first receive signal of the first frequency band and a first transmit filter portion with a passband corresponding to a first transmit signal of the first frequency band, the filter further including a second duplexer for a second frequency band and having a second receive filter portion with a passband corresponding to a second receive signal of the second frequency band and a second transmit filter portion with a passband corresponding to a second transmit signal of the second frequency band;

a signal path configured to couple between an antenna and the filter, the filter including an antenna-side port coupling the signal path to the first duplexer and the second duplexer;

a first receive amplifier coupled to the first receive filter portion of the first duplexer of the filter, the first receive amplifier configured to amplify the first receive signal;

a second receive amplifier coupled to the second receive filter portion of the second duplexer of the filter, the second receive amplifier configured to amplify the second receive signal; and a first tunable termination impedance coupled to the first transmit filter portion of the first duplexer of the filter through the first band switch, the first tunable termination impedance configured to terminate the first transmit filter portion of the first duplexer.

16. The radio frequency front end system of claim 15 wherein the first band switch is further configured to couple the second transmit filter portion of the second duplexer of the filter to the first tunable termination impedance.

17. The radio frequency module of claim 1 further comprising a second tunable termination impedance coupled to the second transmit filter portion of the second duplexer of the filter through the first band switch, the second tunable termination impedance configured to terminate the second transmit filter portion of the second duplexer.

18. The radio frequency module of claim 1 wherein the first tunable termination impedance is further coupled to the second transmit filter portion of the second duplexer of the filter through the first band switch.

19. The wireless device of claim 8 wherein the radio frequency front end module further includes a second tunable termination impedance coupled to the second transmit filter portion of the second duplexer of the filter through the first band switch, the second tunable termination impedance configured to terminate the second transmit filter portion of the second duplexer.

20. The wireless device of claim 8 wherein the first tunable termination impedance is further coupled to the second transmit filter portion of the second duplexer of the filter through the first band switch.

* * * * *